United States Patent

Nitta et al.

[11] 3,714,312
[45] Jan. 30, 1973

[54] METHOD OF PRODUCING REINFORCED PIPE

[75] Inventors: Haruo Nitta; Naotoshi Sagawa, both of Yokkaichi, Japan

[73] Assignee: Mitsubishi Petrochemical Co., Ltd., Tokyo, Japan

[22] Filed: Aug. 11, 1970

[21] Appl. No.: 62,936

[30] Foreign Application Priority Data

Aug. 11, 1969 Japan..................................44/63101

[52] U.S. Cl. ..................264/108, 264/113, 264/114, 264/241, 264/310, 264/311, 264/349
[51] Int. Cl..............................B29c 5/04, B29d 3/02
[58] Field of Search......264/310, 312, 311, 241, 108, 264/112, 113, 114, 211, 349; 18/26 RR

[56] References Cited

UNITED STATES PATENTS

| | | | |
|---|---|---|---|
| 3,475,532 | 10/1969 | Guldenfels et al.....................264/310 |
| 3,217,078 | 11/1965 | Kleiber...................................264/310 |
| 3,150,219 | 9/1964 | Schmidt................................264/311 |
| 3,445,551 | 5/1969 | Griffin....................................264/21 |

FOREIGN PATENTS OR APPLICATIONS 757,550  4/1967  Canada ..............................264/310

Primary Examiner—Robert F. White
Assistant Examiner—Jeffery R. Thurlow
Attorney—Sughrue, Rothwell, Mion, Zin & Macpeak

[57] ABSTRACT

The invention relates to a method of manufacturing reinforced pipes, particularly those having a strong resistivity against internal pressure as well as compressive strength due to external crushing forces, made of a material obtained by mixing thermoplastic synthetic resin powder and a fibrous inorganic substance. The material is introduced in a rotatable metal mold in a predetermined quantity, and the metal mold is heated externally while it is rotating. The fibrous substance is diffused uniformly in the molten plastic material and aligned in the peripheral direction, and thus the reinforced pipe is produced.

6 Claims, 5 Drawing Figures

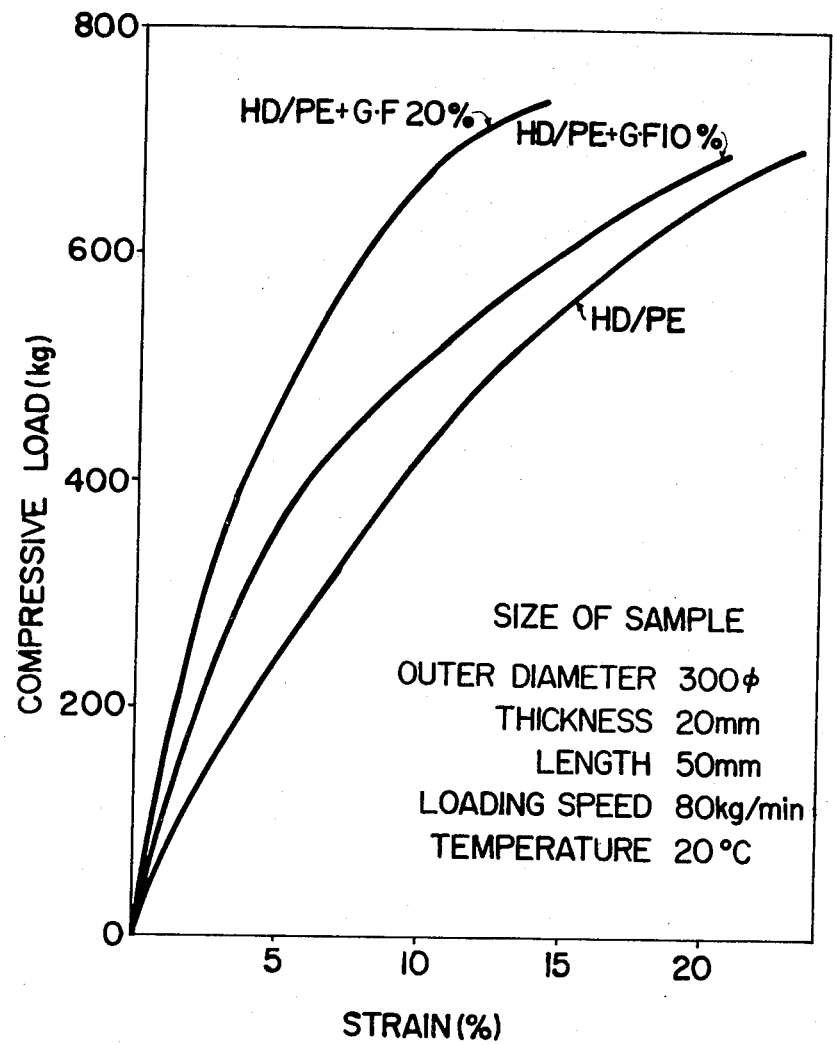

3,714,312

METHOD OF PRODUCING REINFORCED PIPE

BACKGROUND OF THE INVENTION

Present invention relates to a method of producing reinforced pipes made of synthetic resins, and more particularly, it relates to a method of producing hollow bodies such as pipes filled with inorganic fibers such as glass fibers.

Known methods for producing pipes filled with inorganic fibers, are extrusion molding, and molding of a fibrous substance impregnated with polyester resin. In the former process of extrusion molding, it is extremely difficult to fill the material with fibers aligned in the peripheral direction. As for the latter process, there is a disadvantage that it cannot be used with thermoplastic resins.

SUMMARY OF THE INVENTION

In view of the above facts, it is the fundamental object of the present invention to provide a method for producing hollow bodies such as pipes reinforced by filling inorganic fibers utilizing a method known generally as rotary molding.

Another object of the present invention is to produce high-strength reinforced pipes in which inorganic fibers are diffused uniformly.

Still another object of the invention is to produce reinforced pipes, particularly having a resistivity against internal pressure and a resistance against external crushing forces, wherein inorganic fibers are diffused uniformly and in a state of alignment in the peripheral direction.

In rotary molding which has been known generally, the method comprises heating the metal mold while rotating it to fuse the material and adhere it to the wall surface of the metal mold, then cooling the mold, and taking the product out of the metal mold after the product has been solidified. In this invention, however, since glass fibers, for example, are used as a reinforcing material, it has been found that several problems arise in the use of rotary molding.

Namely, when the production is carried out by dry blending of synthetic resin powder and glass fibers, as is the usual case in rotary molding, because the glass fiber is larger than the synthetic resin powder, the glass fibers are separated toward the central portion of the material, and thus the plastic and the glass fibers are separated into two layers, so that the strength of the formed product is not improved.

This phenomenon is especially true when the material, used for a product having a thickness of 2mm or more, is used in a single filling. In such cases, it has been found that the material is separated into two layers.

Furthermore, as for the manner in which the reinforcing material, such as glass fibers to be blended, is arranged with respect to the peripheral direction, it has been found that the material is affected considerably by the rotating speed of the metal mold, or more strictly, it depends upon the peripheral speed of the wall surface of the metal mold.

Thus, in the case where a speed is used by which all of the material filled in the metal mold is adhered to or stuck fast to the wall surface of the metal mold at the same time the material is filled in the metal mold, actuated by a considerable centrifugal force, as in usual centrifugal cast moldings, the fibers do not line up a peripheral direction, but end up in an irregular pattern.

As for the condition of an orderly arrangement, it was found that, in case of molding pipes, the molding should be effected with a rotating speed having a condition that the material should be slipped down on the wall surface of the metal mold, which is rotating in a certain direction, at an angle of less than about 135°, preferably of 45° to 90° (rising angle $\theta$).

Such an inclined falling of the material on the wall surface of the metal mold is a phenomenon occurring by a dynamic balance between the gravity of the material, frictional force on the material, and the centrifugal force, and so on. The importance of these conditions is evident from the following discussion.

Namely, when the fiber is falling in a state of being blended with plastic material along the wall surface of rotating metal mold, one end of a fiber is adhered on resin which is melted previously, and the other end is at the same time forcibly arranged in a peripheral direction by unmelted material powder falling along the wall surface of metal mold, the same principle as in the case of water plants flowing in a river.

Secondly, the size of such a fiber is preferably that which will not intertwine with another while rotating and forming, and by keeping the size at about 6–15 mm, the fibers are blended with the material resin without any separation.

The charging dose of the mixture of the material plastic and the fiber in the metal mold is preferably that which forms a thickness of less than 2 mm from the surface of the metal mold. If charging is effected further, the separation is likely to be produced. Accordingly, when a large thickness is required, a plurality of forming or molding operations should be utilized so that a molding having a desired thickness can be obtained.

BRIEF DESCRIPTION OF THE DRAWINGS

FIG. 5 is a graph showing the results of a squeezing load test on a pipe.

DESCRIPTION OF THE PREFERRED EMBODIMENT

Figure 1:
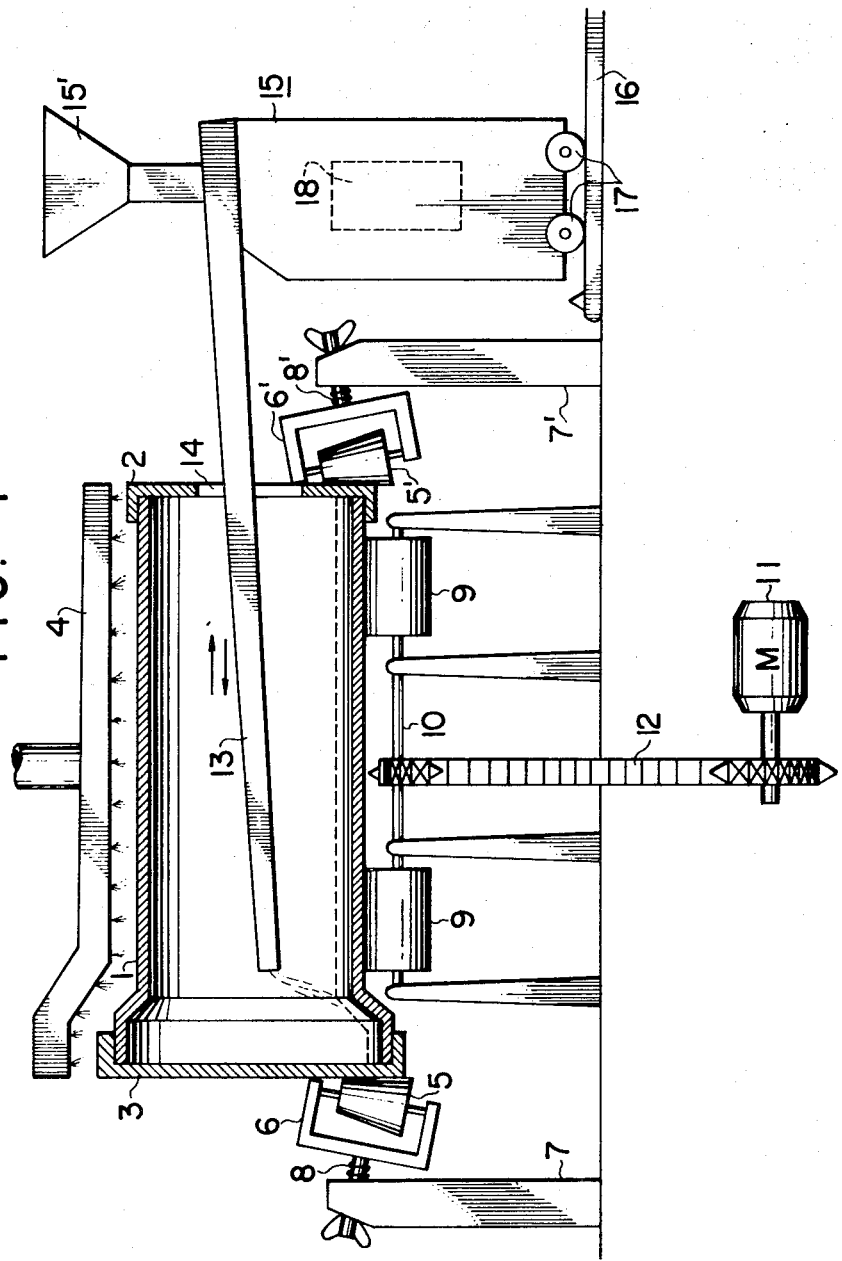
FIG. 1 is a side elevational view of apparatus adapted to perform the method according to the present invention.

Referring to FIG. 1, the numeral 1 designates a metal molding main body presenting a desired shape; 2 and 3 are cover members fitted on the openings at opposite ends of said metal mold main body 1; 4 is a heating burner arranged around the external periphery of the metal mold main body 1; and 5, 5' are supporting wheels, each operating as a stopper, having a conical shape and being in slidable engagement with the cover members 2, 3 of the metal mold body. The supporting wheels 5, 5' are so constructed that they can be moved forwardly and backwardly within a certain range by interposing coil springs 8, 8' between frame members 6, 6', which support the supporting wheels 5, 5', and the supports 7, 7'.

The numerals 9 designate a plurality of rollers supporting the external periphery of the metal mold main body 1 for rotation. The rotation of the motor 11 is transmitted to the shaft 10 for the rollers 9 through a drive chain 12 of any suitable type.

The numeral 13 indicates a supply tube for material which can be inserted into the metal mold main body 1 through an opening 14 in the cover member 2, the supply tube 13 being connected to a hopper 15' of a material supplying device 15. The material supplying device 15 is movable forwardly and backwardly by means of wheels 17 mounted on a track defined by rails 16 or the like. The powdered material received, in the hopper 15' can be transferred and supplied smoothly into the metal mold main body 1 through the supply pipe 13 by means of a vibrating mechanism 18 accommodated in the material supplying device 15.

Now, a process of molding will be described using high density polyethylene having a M.I. = 5.0, a specific gravity = 0.960, a grain size of 30 mesh or below and glass fibers having a length of 10 mm, as the raw materials.

In practice, the metal mold main body is preheated while being rotated at a speed of 30 revolutions per minute. The metal mold main body 1 preferably is made of steel plate having a thickness of 2 mm, and is heated to a surface temperature of about 300°C.

First, the polyethylene alone is supplied into the metal mold main body 1 through the material supplying tube 13 at a rate of about 200g/hour. In this process, the feeding outlet of the material supplying tube 13 is transferred from the innermost end portion of the metal mold main body 1 to the outermost portion thereof at a constant speed by moving the material supplying device 15 on the rails 16. When the material supplying tube 13 is transferred up to the outermost portion of the metal mold main body 1, the material supplying device 15 moves in an opposite direction so that a uniform resin layer is formed on the inner wall of the metal mold main body 1. The frequency of the forward and backward motion of the material supplying tube 13 is determined by a speed in which a successive filling of the material is effected just after the melting of the material filled previously has been substantially completed.

In this way, an outer layer A formed by a high density polyethylene alone and having a thickness of about 2 mm is molded.

Figure 2:
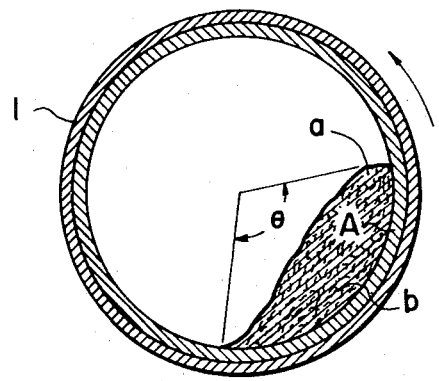
FIG. 2 is an end view in section of a portion of the apparatus shown in FIG. 1, showing the manner in which the material is dropped into the metal mold.
Figure 3:
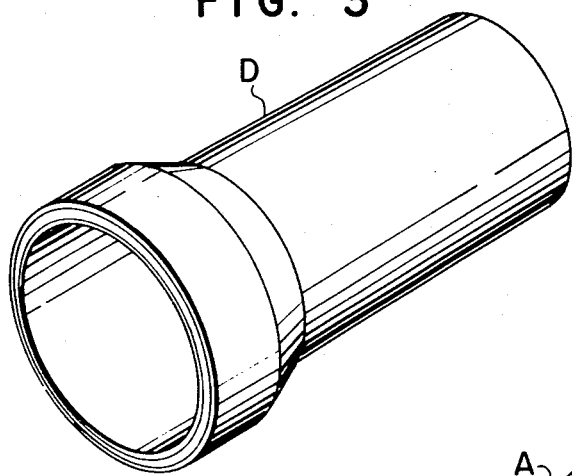
FIG. 3 is a perspective view showing a pipe produced in accordance with the method of the present invention.

Then, a mixture of polyethylene a blended with 30 percent by weight of glass fibers b is added to the mold body 1 in such an amount that a thickness of less than 2 mm is obtained per one forming operation in the same manner as described above. This process is repeated a large number of times until an intermediate layer B having a thickness of about 21 mm is obtained, as shown in FIG. 2. In this case, the angle θ was approximately 90°. Next, the high density polyethylene a alone is added to the mold body 1 to form an inner layer C (see FIG. 4) having a thickness of 2 mm in the same manner as above.

Then, approximately 20 minutes after forming the inner layer C, it is cooled in any suitable manner such as by an air flow and/or cooling water, so that the moulded produce is solidified. The finished pipe D is then removed from the metal mold 1.

Figure 4:
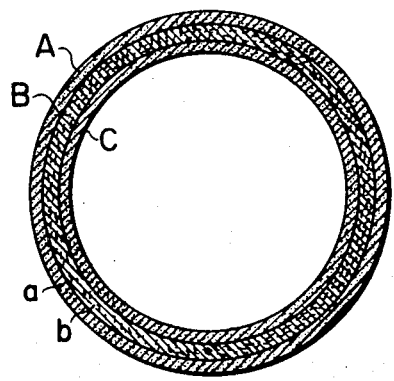
FIG. 4 is an end view in section of a reinforced pipe produced according to the present invention.

In such a molding process, it takes about 40 minutes of heating to form a layer having a thickness of about 25 mm. Thus a pipe, as shown in FIG. 4, is obtained which has the inner layer C, the outer layer A, and the intermediate layer B with glass fibers arranged in an aligned manner in the peripheral direction.

In the method described above, the material can be supplied continuously by continuously reciprocating the material supplying device 15, or the device can be stopped for a certain period each time it reaches the end of its path. In any event, it is necessary to limit the amount of material to that forming a layer having a thickness of 2 mm or less, and a succeeding supply of material should be effected after the material which has been supplied previously is melted and adhered on the wall.

The following are illustrative examples of the method of the present invention:

EXAMPLE 1

A metal mold having an inner diameter of 300 mm, and a length of 1,000 mm is heated while rotated at 30 RPM, and the heating is continued until the surface temperature of the metal mold reaches to 300°C.

Next, a high density polyethylene having a grain size of 70 mesh (specific gravity: 0.950. MI = 5.0) is introduced into the heated metal mold at a rate of 100 g/pass (for a product having a thickness of about 1 mm) after the previously filled material has been melted and adhered on the inner wall of the metal mold, this being continued until the layer of high-density polyethylene alone has a thickness of about 2 mm.

Then, changing the materials, and in the same manner as above, high density polyethylene, dry blended with 10 percent by weight of glass fibers having a length of about 10 mm and a diameter of about 1 mm (about 20 lengths are bonded together) is introduced into the mold at a rate of approximately 100 g/pass, and this process is continued until a layer having a thickness of about 21 mm is formed. The rising angle θ of the resin was approximately 90° in this example.

The material is again changed to the high-density polyethylene alone, and the material is introduced into the mold until a layer having a thickness of 2 mm is obtained in the manner described above. Subsequently, the mold is air-cooled for 20 minutes, and a cooling water is poured over it so that the product in the mold is solidified. The pipe is then removed from the metal mold.

It took approximately 40 minutes of heating to obtain the total layer having a thickness of 25 mm, and a highly excellent pipe was obtained which had on its inner and outer surfaces layers of high-density polyethylene alone, respectively, and in the intermediate layer thereof, glass fibers arranged in aligned order in the peripheral direction.

A pipe produced using the high-density polyethylene alone was compared to a pipe produced in accordance with the method of the present invention. Test pieces were removed from each pipe at the intermediate portion of the wall (that of the layer containing glass fiber in the sample according to the present invention) having a thickness of 5 mm each, and these pieces were tested using an autographic tension tester. The result of the test is shown in Table 1.

TABLE 1

Tension Test

| Material | | Modulus of elasticity (kg/cm$^2$) | Yield Stress (kg/cm$^2$) |
|---|---|---|---|
| 10% glass fiber included | Peripheral direction | 7,500 | 250 |
| | Axial direction | 4,000 | 240 |
| Polyethylene alone | Peripheral direction | 5,000 | 240 |
| | Axial direction | 5,000 | 240 |

From the above table, it is seen that both the modulus of elasticity and the yield stress in the peripheral direction are improved, and that the modulus of elasticity, which is most important in the allowable range of deformation of pipes (5–10%), is highly improved.

EXAMPLE 2

A pipe having a thickness of 20 mm was produced using a high-density polyethylene (specific gravity = 0.950, MI = 5.0) added with 10 percent by weight and 20 percent by weight of glass fibers 10 mm long and about 1 mm in diameter (about 20 lengths thereof are bonded), in a rotary metal mold having an inner diameter of 300 mm, and a length of 500 mm, at a condition of 30 RPM and at a temperature of 300°C.

The pipe obtained was tested by applying external forces at a loading speed of 80 kg/min. The relation between the compressive load and the strain is shown in FIG. 5.

From the result thereof, it is seen that the pipes produced by polyethylene blended with glass fibers has more strength against outer forces than those produced by polyethylene alone.

We claim:

1. In a method for producing a fiber reinforced thermoplastic pipe, wherein the fiber of said pipe has a preferred orientation to improve the strength thereof, comprising the steps of:

1. introducing a thermoplastic synthetic resin into a rotatable mold,
2. heating the mold while rotating to melt the synthetic resin and cause it to adhere thereto,
3. cooling the mold to solidify the formed resin,
4. removing the molded pipe from the mold, the improvement which comprises the steps of:
   a. blending a dry mixture of cut fibrous material having a length of from 6 to 15 mm., and a powdered synthetic resin, said fibrous material being present in an amount sufficient to prevent separation of said resin and said fibrous material and in an amount sufficient to permit a homogeneous wall of resin and fiber to form,
   b. introducing said dry mixture into said mold in an amount to produce a subsequent molten layer on said mold having a thickness less than approximately 2 mm., and capable of embedding said fibrous material into said molten layer,
   c. rotating said mold at a speed relative to said dry unmelted blend that will collect the unmelted blend substantially on an arc less than 135° of said mold surface,
   d. continuing to rotate and heat said mold while said unmelted blend falls down said relatively moving mold surface within said 135° arc until said fibers are set in a peripheral preferred orientation and said blend is melted and uniformly deposited on said mold surface, and
   e. cooling said deposited layer.

2. The method as claimed in claim 1 wherein the fibrous substance is glass fiber.

3. The method as claimed in claim 1 wherein the thermoplastic synthetic resin is a high-density polyethylene.

4. The method as claimed in claim 1, further including the preceeding and subsequent steps of introducing only synthetic resin to form an initial and final smooth layer of formed resin sandwiching said formed layer having cut fibrous material.

5. The method as claimed in claim 4, further including forming a plurality of fibrous cut layers having a thickness less than 2 mm.

6. The method as claimed in claim 1, where said unmelted mixture is introduced while said mold is rotating relative to said unmelted mixture.

* * * * *